United States Patent [19]
Barnes et al.

[11] Patent Number: 6,026,780
[45] Date of Patent: *Feb. 22, 2000

[54] METHOD FOR CONTROLLED TRANSITION BETWEEN USE OF DIFFERENT INJECTION WAVEFORM TYPES IN A HYDRAULICALLY-ACTUATED ELECTRONICALLY-CONTROLLED FUEL INJECTION SYSTEM

[75] Inventors: Travis E. Barnes, Peoria; Michael S. Lukich; Brian G. McGee, both of Chillicothe; Daniel R. Puckett, Peoria; John P. Timmons, Chillicothe, all of Ill.

[73] Assignee: Caterpillar Inc., Peoria, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/993,591

[22] Filed: Dec. 18, 1997

[51] Int. Cl.⁷ .............................. F02B 3/04; F02M 37/00
[52] U.S. Cl. ............................ 123/299; 123/446
[58] Field of Search ..................... 123/295, 299, 123/300, 446

[56] References Cited

U.S. PATENT DOCUMENTS

| | | |
|---|---|---|
| Re. 33,270 | 7/1990 | Beck et al. . |
| 4,922,878 | 5/1990 | Shinogle et al. .......................... 123/490 |
| 5,176,115 | 1/1993 | Campion ............................. 123/179.17 |
| 5,181,494 | 1/1993 | Ausman et al. ........................... 123/446 |
| 5,191,867 | 3/1993 | Glassey .................................... 123/446 |
| 5,331,933 | 7/1994 | Matsushita .............................. 123/295 |
| 5,357,912 | 10/1994 | Barnes et al. ............................ 123/357 |
| 5,359,883 | 11/1994 | Baldwin et al. ........................ 73/117.3 |
| 5,463,996 | 11/1995 | Maley et al. . |
| 5,477,828 | 12/1995 | Barnes . |
| 5,477,834 | 12/1995 | Yoshizu .................................... 123/299 |
| 5,482,017 | 1/1996 | Brehob et al. ........................... 123/299 |
| 5,485,820 | 1/1996 | Iwaszkiewicz . |
| 5,492,098 | 2/1996 | Hafner et al. . |
| 5,492,099 | 2/1996 | Maddock ................................. 123/446 |
| 5,517,972 | 5/1996 | Stockner . |
| 5,564,391 | 10/1996 | Barnes et al. ............................ 123/446 |
| 5,566,660 | 10/1996 | Camplin et al. . |
| 5,632,444 | 5/1997 | Camplin et al. . |
| 5,651,345 | 7/1997 | Miller et al. . |
| 5,669,355 | 9/1997 | Gibson et al. . |
| 5,673,669 | 10/1997 | Maley et al. . |
| 5,687,693 | 11/1997 | Chen et al. . |
| 5,697,342 | 12/1997 | Anderson et al. ....................... 123/446 |
| 5,713,328 | 2/1998 | Anderson et al. ....................... 123/299 |
| 5,717,562 | 2/1998 | Antone et al. ........................... 361/155 |

*Primary Examiner*—Thomas N. Moulis
*Attorney, Agent, or Firm*—Haverstock, Garrett, and Roberts

[57] ABSTRACT

A method for controlling transfer from use of a first injection waveform type to use of a second injection waveform type in a hydraulically-actuated electronically-controlled fuel injection system of an engine includes sensing an engine speed and an engine load when the first injection waveform type is selected and storing the sensed engine speed and the sensed engine load. An actual engine speed is thereafter compared with the stored engine speed and an actual engine load is thereafter compared with the stored engine load. Transfer from use of the first injection waveform type to use of the second injection waveform type is prevented unless at least (i) a difference between the actual engine load and the stored engine load exceeds a predetermined load amount, or (ii) a difference between the actual engine speed and the stored engine speed exceeds a predetermined speed amount.

17 Claims, 3 Drawing Sheets

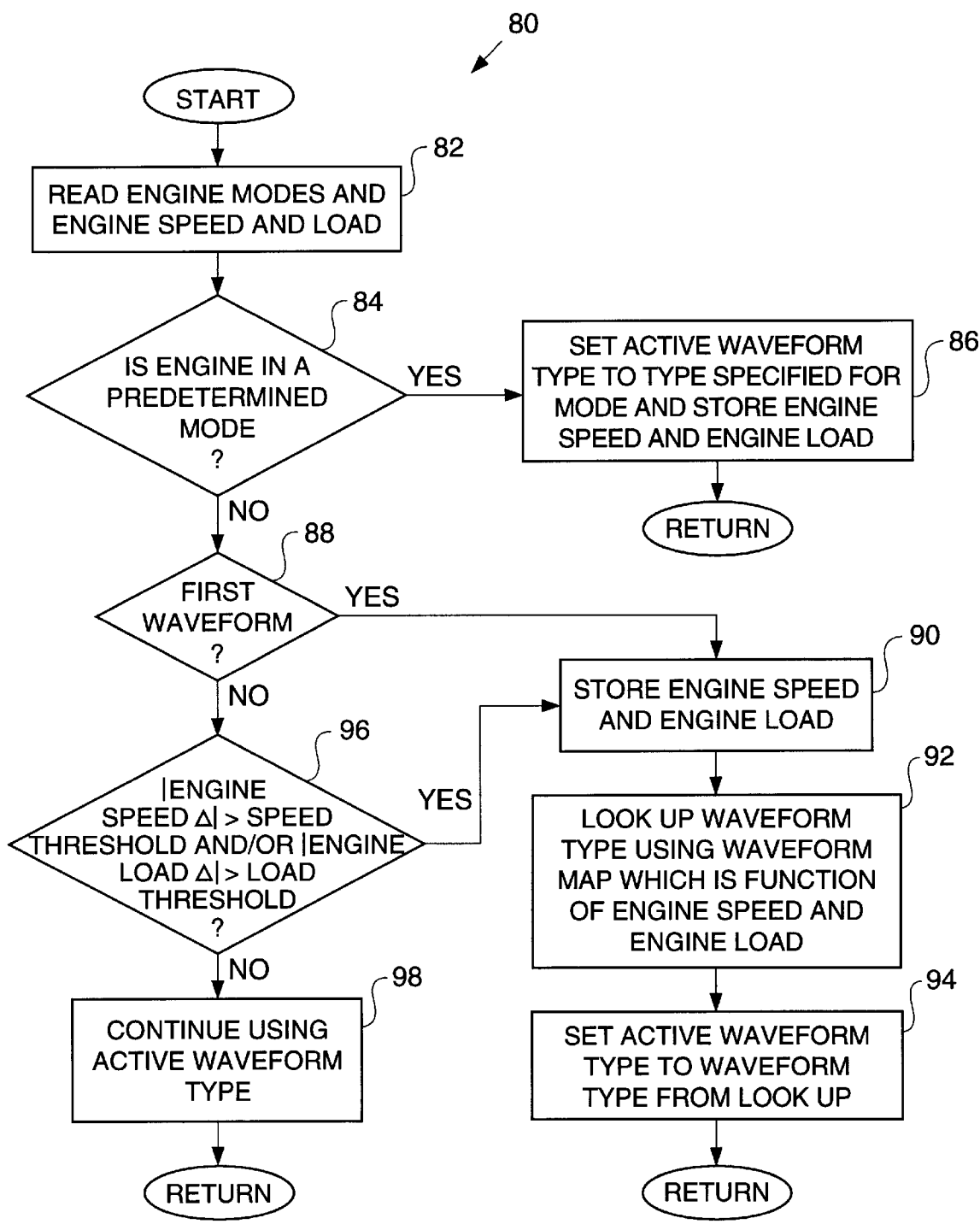

METHOD FOR CONTROLLED TRANSITION BETWEEN USE OF DIFFERENT INJECTION WAVEFORM TYPES IN A HYDRAULICALLY-ACTUATED ELECTRONICALLY-CONTROLLED FUEL INJECTION SYSTEM

TECHNICAL FIELD

This invention relates generally to hydraulically-actuated electronically-controlled fuel injection systems, and more particularly, to a method for controlling transition between use of two different injection waveform types within such a system.

BACKGROUND ART

Emission regulations pertaining to engine exhaust emissions are increasingly become more restrictive throughout the world, including, for example, restrictions on emission of particulates and $NO_x$. Tailoring the injection rate of fuel to a combustion chamber, as well as quantity and timing of such fuel injection, is one way in which to meet such emission regulations. At different engine operating conditions it may be necessary to utilize different injection rate waveforms in order to achieve optimum engine operation and emissions control.

In the past hydraulically-actuated electronically-controlled fuel injection systems have included some mechanical limitations on the variety of achievable injection rate waveform types. In some systems the injectors utilized have also been somewhat limited as to the control current waveform which could be utilized. Resulting problems included injecting fuel too rapidly within a given injection event and allowing fuel to be injected beyond a desired stopping point. Such problems can adversely affect emission outputs and fuel economy.

In a system in which different injection rate waveforms are achievable, it has been determined that transfer from one type of waveform to another type of waveform may need to be controlled under certain circumstances in order to prevent excessive noise, as well as to prevent repeated transition back and forth between two different waveform types.

Accordingly, the present invention is directed to overcoming one or more of the problems as set forth above.

DESCLOSURE OF THE INVENTION

In one aspect of the present invention a method for selectively utilizing an injection waveform map within a hydraulically-actuated electronically-controlled fuel injection system of an engine includes sensing an engine speed and an engine load when the injection waveform map is utilized to select a waveform type and storing the sensed engine speed and the sensed engine load. An actual engine speed is thereafter compared with the stored engine speed and an actual engine load is thereafter compared with the stored engine load. Control of whether the injection waveform map is again utilized to select an injection waveform type is based upon the comparison of the actual engine speed to the stored engine speed and the comparison of the actual engine load to the stored engine load.

In another aspect of the present invention a method for controlling transfer from use of a first injection waveform type to use of a second injection waveform type in a hydraulically-actuated electronically-controlled fuel injection system of an engine includes sensing an engine speed and an engine load when the first injection waveform type is selected and storing the sensed engine speed and the sensed engine load. An actual engine speed is thereafter compared with the stored engine speed and an actual engine load is thereafter compared with the stored engine load. Transfer from use of the first injection waveform type to use of the second injection waveform type is prevented unless at least (i) a difference between the actual engine load and the stored engine load exceeds a predetermined load amount, or (ii) a difference between the actual engine speed and the stored engine speed exceeds a predetermined speed amount.

BRIEF DESCRIPTION OF THE DRAWINGS

FIG. 3 a flowchart of operating steps in accordance with the present invention.

BEST MODE FOR CARRYING OUT INVENTION

Figure 1:
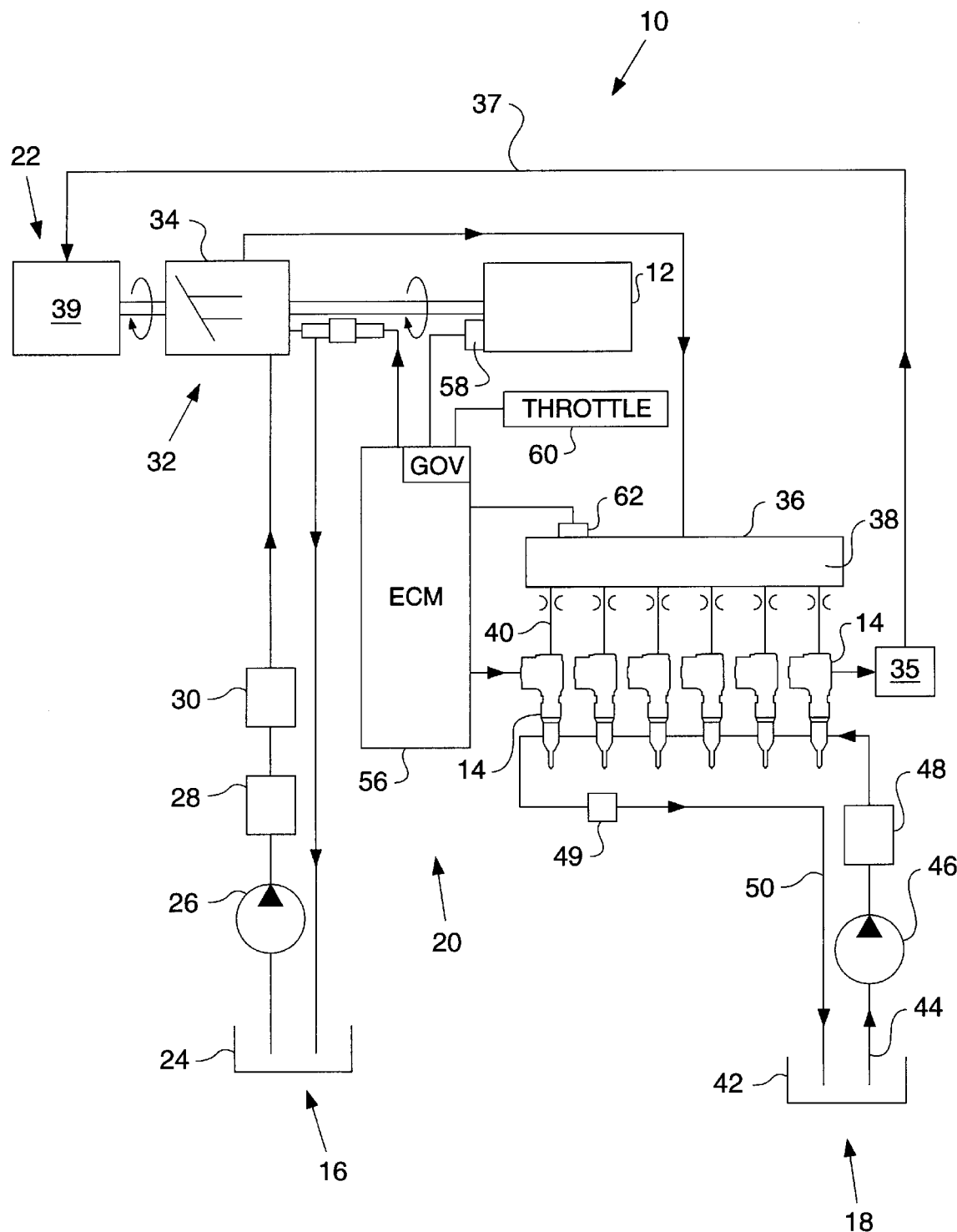
FIG. 1 is a diagrammatic general schematic view of a hydraulically-actuated electronically-controlled injector fuel system for an engine having a plurality of injectors.

Referring to FIG. 1, there is shown a hydraulically-actuated electronically-controlled fuel injector system 10 (hereinafter referred to as HEUI-B fuel system). Typical of such systems are those shown and described in U.S. Pat. No. 5,463,996, U.S. Pat. No. 5,669,355, U.S. Pat. No. 5,673,669, U.S. Pat. No. 5,687,693, and U.S. Pat. No. 5,697,342. The exemplary HEUI-B fuel system is shown in FIG. 1 as adapted for a direct-injection diesel-cycle internal combustion engine 12.

HEUI-B fuel system 10 includes one or more hydraulically-actuated electronically-controlled injectors 14, such as unit fuel injectors, each adapted to be positioned in a respective cylinder head bore of engine 12. The system 10 further includes apparatus or means 16 for supplying hydraulic actuating fluid to each injector 14, apparatus or means 18 for supplying fuel to each injector, apparatus or means 20 for electronically controlling the manner in which fuel is injected by injectors 14, including timing, number of injections, and injection profile, and actuating fluid pressure of the HEUI-B fuel system 10 independent of engine speed and load. Apparatus or means 22 for recirculating or recovering hydraulic energy of the hydraulic actuating fluid supplied to injectors 14 is also provided.

Hydraulic actuating fluid supply means 16 preferably includes an actuating fluid sump 24, a relatively low pressure actuating fluid transfer pump 26, an actuating fluid cooler 28, one or more actuating fluid filters 30, a source or means 32 for generating relatively high pressure actuating fluid, such as a relatively high pressure actuating fluid pump 34, and at least one relatively high pressure fluid manifold 36. The actuating fluid is preferably engine lubricating oil. Alternatively the actuating fluid could be fuel.

Apparatus 22 may include a waste actuating fluid control valve 35 for each injector, a common recirculation line 37, and a hydraulic motor 39 connected between the actuating fluid pump 34 and recirculation line 37.

Actuating fluid manifold 36, associated with injectors 14, includes a common rail passage 38 and a plurality of rail branch passages 40 extending from common rail 38 and arranged in fluid communication between common rail 38 and actuating fluid inlets of respective injectors 14. Common rail passage 38 is also arranged in fluid communication with the outlet from high pressure actuating fluid pump 34.

Fuel supplying means 18 includes a fuel tank 42, a fuel supply passage 44 arranged in fluid communication between fuel tank 42 and a fuel inlet of each injector 14, a relatively low pressure fuel transfer pump 46, one or more fuel filters 48, a fuel supply regulating valve 49, and a fuel circulation and return passage 50 arranged in fluid communication between injectors 14 and fuel tank 42. The various fuel passages may be provided in a manner commonly know in the art.

Electronic controlling means 20 preferably includes an electronic control module (ECM) 56, the use of which is well known in the art. ECM 56 typically includes processing means such as a microcontroller or microprocessor, a governor (GOV) such as a proportional integral derivative (PID) controller for regulating engine speed, and circuitry including input/output circuitry and the like. ECM 56 may be used to control fuel injection timing, fuel quantity injected, fuel injection pressure, number of separate injections per injection cycle, time intervals between injection segments, and fuel quantity injected by each injection segment. Each of such parameters are variably controllable independent of engine speed and load.

Associated with a camshaft of engine 12 is an engine speed sensor 58 which produces speed indicative signals. Engine speed sensor 58 is connected to the governor of ECM 56 for monitoring of the engine speed and piston position for timing purposes. A throttle 60 is also provided and produces signals indicative of a desired engine speed, throttle 60 also being connected to the governor of ECM 56. An actuating fluid pressure sensor 62 for sensing the pressure within common rail 38 and producing pressure indicative signals is also connected to ECM 56.

Each of the injectors 14 is preferably of a type such as that shown and described in one of U.S. Pat. No. 5,463,996, U.S. Pat. No. 5,669,355, U.S. Pat. No. 5,673,669, U.S. Pat. No. 5,687,693, and U.S. Pat. No. 5,697,342. However, it is recognized that the present invention could be utilized in association with other variations of hydraulicallyactuated electronically-controlled injectors.

Figure 2:
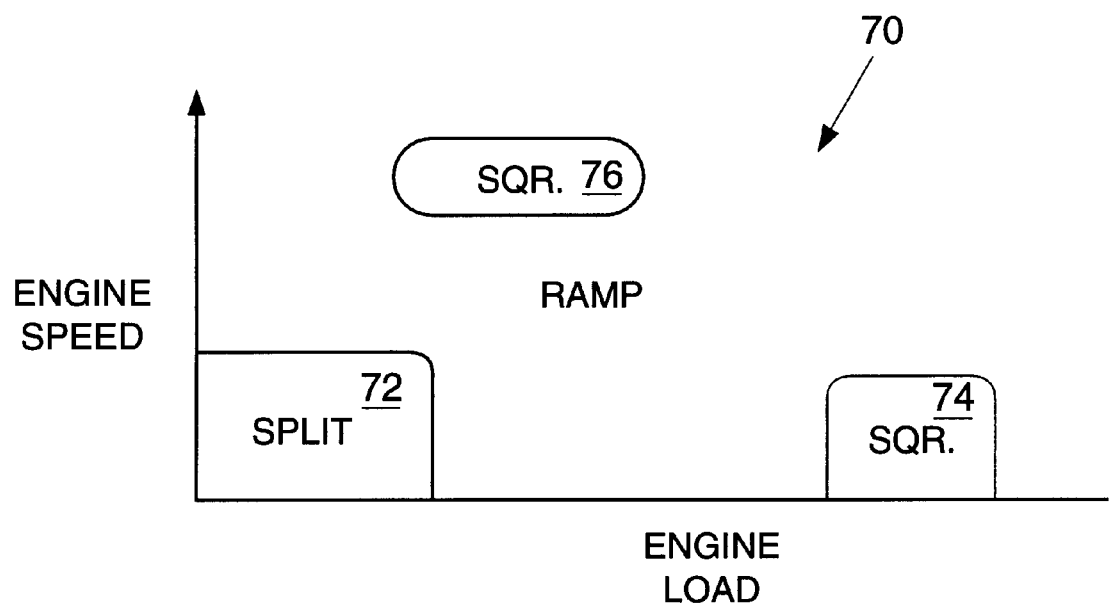
FIG. 2 is a graphical representation of a map of injection waveform types as a function of engine speed and engine load.

Referring now to FIG. 2, a graphical representation of an injection waveform map 70 utilized in the present invention is shown, map 70 being a function of engine speed and engine load. Waveform map 70 is merely representative of one waveform map which could be utilized and it is recognized that the present invention could be utilized in association with other waveform maps. As shown by region 72 at relatively low engine speeds and engine loads use of a split injection waveform is desired in which fuel is delivered by two distinct injection events for a given injection cycle. In particular, a prime or pilot shot control signal delivered to the injector causes injection of a pilot amount of fuel, the injection rate during pilot shot injection increasing in a ramped manner. After some delay a main shot control signal delivered to the injector causes injection of fuel at a rate which is generally constant or square. As indicated by region 74, at relatively high engine loads use of a constant or square injection rate is desired. Such square injection rate is achieved by delivering a first, short control signal to the injector which causes fuel therein to be compressed but which does not initiate an injection event. After some delay, a second control signal is delivered to the injector which causes fuel to be injected at a square injection rate. Use of such square injection is also desirable within region 76. Within the remaining portions of the map, use of a ramped injection rate is desired. Such ramped injection is achieved by delivering a single control signal to the injector.

In utilizing injection waveform map 70 transfer from use of one waveform type to use of another waveform type would generally occur when the engine speed and load cross from one region of the map to another. However, in the present invention such transfer is more controlled. In this regard, a flowchart 80 of operating steps in accordance with the present invention is shown in FIG. 2. Such operating steps may be incorporated within ECM 56 by appropriate programming techniques known to those in the art. Similarly, the injection waveform map 70 may be stored in memory associated with ECM 56 for use during engine operation, such stored map including waveform type indicators for values of engine speed and engine load.

At step 82 the engine modes and engine speed and engine load are read. The engine modes may be determined from global variables stored in memory. The engine speed may be determined based upon one or more signals from speed sensor 58. The engine load is preferably determined based upon a total fuel rate output by the governor, but could also be determined from a sensed actuating fluid pressure. If the engine is in a predetermined mode at step 84, such as a cold mode, a cranking mode or a split disabled mode, then it is desirable to use an waveform type which has previously been specified for such mode. Therefore, an active waveform type, that is the injection waveform type to be used for injection, is set to the type specified for the given mode at step 86 and the engine speed and engine load are stored in memory.

However, if the engine is not in one of such modes, then at step 88 a determination is made as to whether this is the first waveform. Such step 88 is used to assure that at some previous point an engine speed and engine load have been previously stored so that the comparisons explained below have some reference. If it is the first waveform, the engine speed and engine load are stored at step 90 and at step 92 injection waveform map 70 is utilized to look up a waveform type according to the engine speed and engine load. Once the injection waveform type is looked up the active waveform type is set to the looked up waveform type at step 94. The injection system will then utilize the active waveform type for injection purposes.

If at step 88 it is not the first waveform, then the engine speed and engine load are compared with the previously stored engine speed and engine load to determine if a change in engine speed |ENG. SPD. Δ| exceeds a speed threshold and to determine if a change in engine load |ENG. LOAD Δ| exceeds a load threshold. If neither of the two thresholds are exceed then the current active injection waveform type will continue to be used as indicated at step 98. However, if at least one of the thresholds is exceeded then steps 90 through 94 are executed.

Industrial Applicability

Operation of fuel system 10 as described above with respect to flowchart 80 provides selective utilization of waveform map 70. Each time the waveform map is utilized the engine speed and engine load are stored. Use of waveform map 70 to select an injection waveform type is thereafter controlled based upon a determination of whether the actual engine speed and/or actual engine load has changed significantly since the last time the waveform map was utilized, a significant change being one that is greater than the threshold speed or threshold load. The threshold speed could be 100 RPM or some other speed value. The threshold load could be 10 mm$^3$ of total fuel rate or some other fuel value. Use of such thresholds creates a hysteresis band for both engine load and engine speed to prevent the fuel system from switching back and forth repeatedly between different injection waveform types, which back and forth switching could otherwise occur if the engine were operating at an engine speed and load at the border between two regions of waveform map 70.

Operation of fuel system 10 as described above also enables controlled transfer from use of one waveform type to another waveform type. Transfer from use of one waveform type to another is prevented unless a significant change in actual engine speed or actual engine load is experienced. Thus, repeated transfer back and forth between two different injection waveform types is prevented.

Similarly, noise levels typically experienced during transfer from one type of injection waveform to another type of injection waveform are reduced because the speed threshold and load threshold may be selected to assure that the engine is an acceleration or deceleration mode, which modes involve other noise causing events which will mask the waveform transition noise.

It is recognized that flowchart 80 is merely representative of one manner of organizing the steps of the present invention and that other variations could be utilized without departing from the spirit of the present invention. Further, although the discussion herein has referred specifically to split injection waveforms, square injection waveforms, and ramped injection waveforms, it is recognized that other injection waveform types now exist, or could be developed, and that the present invention is generally applicable to transfer between any two different waveform types.

Other aspects, objects and advantages of the present invention can be obtained from a study of the drawings, the disclosure and the appended claims.

We claim:

1. A method for selectively utilizing an injection waveform map within a hydraulically-actuated electronically-controlled fuel injection system of an engine, the method comprising the steps of:

sensing an engine speed and an engine load when the injection waveform map is utilized to select a waveform type and storing the sensed engine speed and the sensed engine load;

comparing an actual engine speed with the stored engine speed;

comparing an actual engine load with the stored engine load; and controlling whether the injection waveform map is again utilized to select an injection waveform type based upon the comparison of the actual engine speed to the stored engine speed and the comparison of the actual engine load to the stored engine load.

2. The method, as set forth in claim 1, including the step of:

preventing further use of the injection waveform map to select an injection waveform type unless one of the following conditions exist:
(i) a difference between the actual engine load and the stored engine load exceeds a load threshold;
(ii) a difference between the actual engine speed and the stored engine speed exceeds a speed threshold.

3. The method, as set forth in claim 2, wherein the speed threshold is about 100 RPM.

4. The method, as set forth in claim 2, including the step of:

monitoring a total fuel rate indicator output by a fuel system governor and utilizing the total fuel rate as a load indicator.

5. The method, as set forth in claim 4, wherein the load threshold is about 10 mm$^3$ of total fuel rate.

6. The method, as set forth in claim 1, including the step of:

sensing a pressure within an injector actuating fluid rail and utilizing the sensed pressure as a load indicator.

7. A method for controlling transfer from use of a first injection waveform type to use of a second injection waveform type in a hydraulically-actuated electronically-controlled fuel injection system of an engine, the method comprising the steps of:

sensing an engine speed and an engine load when the first injection waveform type is selected and storing the sensed engine speed and the sensed engine load;

comparing an actual engine speed with the stored engine speed;

comparing an actual engine load with the stored engine load;

preventing transfer from use of the first injection waveform type to use of the second injection waveform type unless at least one of the following conditions exist:
(i) a difference between the actual engine load and the stored engine load exceeds a load threshold;
(ii) a difference between the actual engine speed and the stored engine speed exceeds a speed threshold.

8. The method, as set forth in claim 7, including the step of:

utilizing an injection waveform map to select an injection waveform type if at least one of conditions (i) and (ii) exist.

9. The method, as set forth in claim 8, wherein the waveform map is a three dimensional map which is a function of engine load and engine speed.

10. The method, as set forth in claim 9, wherein the waveform map stores at least a split injection waveform indicator, a ramped injection waveform indicator, and a square injection waveform indicator.

11. The method, as set forth in claim 7, including the step of:

monitoring a total fuel rate indicator output by a fuel system governor.

12. The method, as set forth in claim 7, wherein the first injection waveform type is a split injection waveform and the second injection waveform type is a ramped injection waveform.

13. The method, as set forth in claim 7, wherein the first injection waveform type is a ramped injection waveform and the second injection waveform type is a split injection waveform.

14. The method, as set forth in claim 7, wherein the first injection waveform type is square injection waveform and the second injection waveform type is a ramped injection waveform.

15. The method, as set forth in claim 7, wherein the first injection waveform type is a ramped injection waveform and the second injection waveform type is a square injection waveform.

16. The method, as set forth in claim 7, wherein the first injection waveform type is a split injection waveform and the second injection waveform type is a square injection waveform.

17. The method, as set forth in claim 7, wherein the first injection waveform type is a square injection waveform and the second injection waveform type is a split injection waveform.

* * * * *